US010922757B2

(12) United States Patent
Hu

(10) Patent No.: US 10,922,757 B2
(45) Date of Patent: Feb. 16, 2021

(54) BLOCKCHAIN-BASED COMMODITY CLAIM METHOD AND APPARATUS, AND ELECTRONIC DEVICE

(71) Applicant: Advanced New Technologies Co., Ltd., Grand Cayman (KY)

(72) Inventor: Danqing Hu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/424,853

(22) Filed: May 29, 2019

(65) Prior Publication Data

US 2019/0370905 A1 Dec. 5, 2019

(30) Foreign Application Priority Data

May 29, 2018 (CN) .......................... 2018 1 0534737

(51) Int. Cl.
*G06Q 40/08* (2012.01)
*G06F 16/245* (2019.01)
*G06F 16/27* (2019.01)

(52) U.S. Cl.
CPC .......... *G06Q 40/08* (2013.01); *G06F 16/245* (2019.01); *G06F 16/27* (2019.01)

(58) Field of Classification Search
CPC .................................................... G06Q 40/08
USPC ............................................................ 705/4
See application file for complete search history.

(56) References Cited

U.S. PATENT DOCUMENTS

| | | |
|---|---|---|
| 6,310,966 B1 | 10/2001 | Dulude et al. |
| 9,998,286 B1 * | 6/2018 | Ramathal .............. H04L 9/3239 |
| 2004/0162786 A1 | 8/2004 | Cross et al. |
| 2007/0234058 A1 | 10/2007 | White |
| 2009/0313129 A1 | 12/2009 | Rothschild |

(Continued)

FOREIGN PATENT DOCUMENTS

| | | |
|---|---|---|
| CN | 106529946 | 3/2017 |
| CN | 106845210 | 6/2017 |

(Continued)

OTHER PUBLICATIONS

"A Blockchain Framework for Insurance Processes," by M Raiker, S Mazumdar, S Ruj, S Sen Gupta, A Chattopadhyay, and K Lam. 2018 9th IFIP International Conference on New Technology Mobility and Security (NTMS). Conf. Date: Feb. 26-28, 2018. IEEE Xplore Date: Apr. 2, 2018 (Year: 2018).*

(Continued)

*Primary Examiner* — Sara C Hamilton
(74) *Attorney, Agent, or Firm* — Fish & Richardson P.C.

(57) ABSTRACT

Appearance data associated with a target commodity is collected by a blockchain node device, where original appearance data associated with the target commodity is registered with a distributed database associated with a blockchain in advance. Whether a damage event occurs on the target commodity is determined by the blockchain node device based on the appearance data and the original appearance data. In response to a determination that the damage event occurs on the target commodity, a smart contract corresponding to the target commodity is invoked by the blockchain node device. Commodity damage claim logic stated in the smart contract is executed by the blockchain node device to complete a commodity damage claim for the target commodity.

20 Claims, 4 Drawing Sheets

(56) References Cited

U.S. PATENT DOCUMENTS

| | | | |
|---|---|---|---|
| 2015/0332283 A1 | 11/2015 | Witchey | |
| 2016/0098730 A1* | 4/2016 | Feeney | G06Q 30/0185 |
| | | | 705/71 |
| 2017/0046709 A1 | 2/2017 | Lee et al. | |
| 2017/0046806 A1* | 2/2017 | Haldenby | G06Q 20/0655 |
| 2017/0147808 A1 | 5/2017 | Kravitz | |
| 2017/0173262 A1 | 6/2017 | Veltz | |
| 2017/0178417 A1 | 6/2017 | Bekas et al. | |
| 2017/0220998 A1 | 8/2017 | Horn et al. | |
| 2017/0232300 A1 | 8/2017 | Tran et al. | |
| 2017/0352012 A1* | 12/2017 | Hearn | G06Q 20/065 |
| 2017/0353309 A1 | 12/2017 | Gray | |
| 2018/0009495 A1 | 1/2018 | David | |
| 2018/0018723 A1 | 1/2018 | Nagla et al. | |
| 2018/0094953 A1 | 4/2018 | Colson et al. | |
| 2018/0096175 A1* | 4/2018 | Schmeling | B29C 64/10 |
| 2018/0108024 A1 | 4/2018 | Greco | |
| 2018/0109516 A1* | 4/2018 | Song | H04L 9/3263 |
| 2018/0117446 A1 | 5/2018 | Tran et al. | |
| 2018/0129945 A1 | 5/2018 | Saxena | |
| 2018/0158054 A1* | 6/2018 | Ardashev | G06Q 20/389 |
| 2018/0218343 A1* | 8/2018 | Kolb | G06Q 20/102 |
| 2018/0260909 A1* | 9/2018 | Li | G06Q 40/12 |
| 2018/0276626 A1* | 9/2018 | Laiben | G06Q 20/0658 |
| 2018/0285810 A1* | 10/2018 | Ramachandran | G06Q 10/087 |
| 2018/0285879 A1 | 10/2018 | Gadnis et al. | |
| 2018/0343114 A1 | 11/2018 | Ben-Ari | |
| 2019/0013943 A1* | 1/2019 | Maim | H04L 9/14 |
| 2019/0080284 A1* | 3/2019 | Kim | G06Q 10/0833 |
| 2019/0102850 A1* | 4/2019 | Wheeler | G06Q 50/188 |
| 2019/0114584 A1* | 4/2019 | Toohey | H04W 4/35 |
| 2019/0156429 A1* | 5/2019 | Beckmann | G06Q 20/40 |
| 2019/0165949 A1* | 5/2019 | Ramos | H04L 9/3263 |
| 2019/0166101 A1* | 5/2019 | Ramos | H04L 63/0421 |
| 2019/0172059 A1* | 6/2019 | Castagna | G06Q 20/389 |
| 2019/0172282 A1* | 6/2019 | Patel | G07C 9/00103 |
| 2019/0179939 A1* | 6/2019 | Govindarajan | G06F 16/27 |
| 2019/0207749 A1* | 7/2019 | McKellar | H04L 9/0637 |
| 2019/0207751 A1* | 7/2019 | Harvey | H04L 9/0637 |
| 2019/0215149 A1* | 7/2019 | Ramasamy | H04L 9/0618 |
| 2019/0304027 A1 | 10/2019 | Hu et al. | |

FOREIGN PATENT DOCUMENTS

| | | |
|---|---|---|
| CN | 107135661 | 9/2017 |
| CN | 107341676 | 11/2017 |
| CN | 107516180 | 12/2017 |
| CN | 107682331 | 2/2018 |
| CN | 107707633 | 2/2018 |
| CN | 107770159 | 3/2018 |
| CN | 107835166 | 3/2018 |
| CN | 107894423 | 4/2018 |
| CN | 108009834 | 5/2018 |
| KR | 20000071931 | 12/2000 |
| KR | 20160111560 | 9/2016 |
| KR | 101701131 | 2/2017 |
| KR | 20170113481 | 10/2017 |
| RU | 2013137723 | 2/2015 |
| TW | M554608 | 1/2018 |
| WO | WO 2001071597 | 9/2001 |
| WO | WO 2017023290 | 2/2017 |
| WO | WO 2017066002 | 4/2017 |
| WO | WO 2017165909 | 10/2017 |
| WO | WO 2017190794 | 11/2017 |
| WO | WO 2018014123 | 1/2018 |
| WO | WO 2018026807 | 2/2018 |

OTHER PUBLICATIONS

"Blockchain and Smart Contracts: Disruptive Technologies for the Insurance Markets," by Ronny Hans, Hendrik Zuber, Amr Rizk, Ralf Steinmetz. Twenty-Third Americas Conference on Information Systems, Boston, 2017. (Year: 2017).*

"Blockchain and Smart Contracts for Insurance: Is the Technology Mature Enough?," by Valentina Gatteshi, Fabrizio Lamberti, Claudio Demartini, Chiara Pranteda and Victor SantaMaria. Future Internet 2018, 10(2), 20. Accepted: Feb 14, 2018; Published: Feb. 20, 2018 (Year: 2018).*

"Smart After All: Block Chain, Smart Contracts, Parametric Insurance, and Smart Energy Grids," by Alan Cohn, Travis West and Chelsea Parker. 1 Geo. L. Tech. Rev. 273 (2017) (Year: 2017).*

"To Blockchain or Not to Blockchain: That is the Question," by Valentina Gatteshi, Fabrizio Lamberti, Claudio Demartini, Chiara Pranteda and Victor SantaMaria. IT Professional. Mar./Apr. 2018. (Year: 2018).*

Yuan et al., "Towards Blockchain-based Intelligent Transportation Systems," 2016 IEEE 19th International Conference on Intelligent Transportation Systems, Nov. 2016, pp. 2663-2668.

Crosby et al., "BlockChain Technology: Beyond Bitcoin," Sutardja Center for Entrepreneurship & Technology Technical Report, Oct. 16, 2015, 35 pages.

Developer.ibm.com [online], "Use Vehicle Sensor Data to Execute Smart Transactions in Blockchain," Jun. 5, 2017, retrieved on Jun. 17, 2019, retrieved from URL<https://developer.ibm.com/articles/cl-blockchain-for-cognitive-iot-apps2/>, 22 pages.

Nakamoto, "Bitcoin: A Peer-to-Peer Electronic Cash System," www.bitcoin.org, 2005, 9 pages.

PCT International Search Report and Written Opinion in International Application No. PCT/US2019/024070, dated Jun. 11, 2019, 7 pages.

PCT International Search Report and Written Opinion in International Application No. PCT/US2019/034262, dated Aug. 15, 2019, 6 pages.

U.S. Appl. No. 16/370,317, Hu et al., filed Mar. 29, 2019.
U.S. Appl. No. 16/752,248, Hu et al., filed Jan. 24, 2020.
U.S. Appl. No. 16/752,345, Hu et al., filed Jan. 24, 2020.

Just-Auto.com [online], "Toyota Explores 'Blockchain' For Driverless Cars Data", Aroq Ltd. Aroq House, May 2017, retrieved on Mar. 3, 2020, retrieved from URL <https://www.just-auto.com/news/toyota-explores-blockchain-for-driverless-cars-data_id176727.aspx>, 1 page.

Extended European Search Report in European Application No. 19727820.3 dated Feb. 7, 2020, 8 pages.

Extended European Search Report in European Patent Application No. 19725264.6, dated Dec. 10, 2019, 11 pages.

Leiding et al., "Self-managed and blockchain-based vehicular ad-hoc networks," Pervasive and Ubiquitous Computing, Sep. 2016, pp. 137-140.

Mckinsey.com [online], "Blockchain in insurance-opportunity or threat?" McKinsey & Company, Insurance, Jul. 2016, Internet URL:<https://www.mckinsey.com/~/media/mckinsey/industries/financial%20ervices/our%20insights/blockchain%20in%20insurance%20opportunity%20or%20threat/blockchain-in-insurance-opportunity-or-threat.ashx>, 9 pages, 2016.

* cited by examiner

US 10,922,757 B2

BLOCKCHAIN-BASED COMMODITY CLAIM METHOD AND APPARATUS, AND ELECTRONIC DEVICE

CROSS-REFERENCE TO RELATED APPLICATIONS

This application claims priority to Chinese Patent Application No. 201810534737.X, filed on May 29, 2018, which is hereby incorporated by reference in its entirety.

TECHNICAL FIELD

One or more implementations of the present specification relate to the field of blockchain technologies, and in particular, to a blockchain-based commodity claim method and apparatus, and an electronic device.

BACKGROUND

A blockchain technology, also referred to as a distributed ledger technology, is an emerging technology in which several computing devices jointly participate in "accounting" and jointly maintain a complete distributed database. Because the blockchain technology is characterized by decentralization and transparency, each computing device can participate in database recording, and computing devices can implement rapid data synchronization, a decentralized system constructed by using the blockchain technology and various execution programs stored in a distributed database of a blockchain for automatic execution are widely used in many fields.

SUMMARY

The present specification provides a blockchain-based commodity claim method, including: collecting appearance data of a target commodity, where the appearance data of the target commodity is registered with a distributed database of the blockchain in advance; determining whether a damage event occurs on the target commodity based on the collected appearance data of the target commodity and the appearance data of the target commodity that is registered with the distributed database in advance; and if yes, invoking a smart contract corresponding to the target commodity, and executing a commodity damage claim logic stated in the smart contract, to complete a commodity damage claim for the target commodity.

Optionally, that the appearance data of the target commodity is registered with a distributed database of the blockchain includes: associating the appearance data of the target commodity with an identity of the target commodity that has been registered with the blockchain and storing the appearance data of the target commodity in the distributed database of the blockchain.

Optionally, before the determining whether a damage event occurs on the target commodity based on the collected appearance data of the target commodity and the appearance data of the target commodity that is registered with the distributed database in advance, the method further includes: querying the stored appearance data that is associated with the identity of the target commodity that has been registered with the blockchain in the distributed database of the blockchain, to obtain the appearance data of the target commodity that is registered with the distributed database in advance.

Optionally, the determining whether a damage event occurs on the target commodity based on the collected appearance data of the target commodity and the appearance data of the target commodity that is registered with the distributed database in advance includes: evaluating a damage degree of the target commodity based on the collected appearance data of the target commodity and the appearance data of the target commodity that is registered with the distributed database in advance, to obtain a damage degree score used to indicate the damage degree; determining whether the damage degree score reaches a predetermined threshold; and if yes, determining that the damage event occurs on the target commodity.

Optionally, the determining whether a damage event occurs on the target commodity based on the collected appearance data of the target commodity and the appearance data of the target commodity that is registered with the distributed database in advance includes: determining whether a key position of the target commodity is damaged based on the collected appearance data of the target commodity and the appearance data of the target commodity that is registered with the distributed database in advance; and if yes, determining that the damage event occurs on the target commodity.

Optionally, the invoking a smart contract corresponding to the target commodity includes: broadcasting the damage event corresponding to the target commodity to the blockchain, so that member node devices in the blockchain perform consensus processing on the damage event; and if a consensus is reached on the damage event, invoking the smart contract corresponding to the target commodity.

Optionally, an outer surface of the target commodity is coated with an optical medium that is used to cure the appearance data of the target commodity; and the collecting appearance data of a target commodity includes: collecting, by using an installed optical sensor, the appearance data of the target commodity that is cured by the optical medium.

Optionally, the optical medium is a nanometer-level optical film.

Optionally, the blockchain is a consortium blockchain.

The present specification further provides a blockchain-based commodity claim apparatus, including: a collection module, configured to collect appearance data of a target commodity, where the appearance data of the target commodity is registered with a distributed database of the blockchain in advance; a determining module, configured to determine whether a damage event occurs on the target commodity based on the collected appearance data of the target commodity and the appearance data of the target commodity that is registered with the distributed database in advance; and a claim module, configured to invoke a smart contract corresponding to the target commodity and execute a commodity damage claim logic stated in the smart contract if the damage event occurs on the target commodity, to complete a commodity damage claim for the target commodity.

Optionally, the apparatus further includes: a registration module, configured to associate the appearance data of the target commodity with an identity of the target commodity that has been registered with the blockchain and store the appearance data of the target commodity in the distributed database of the blockchain.

Optionally, the determining module is further configured to query the stored appearance data that is associated with the identity of the target commodity that has been registered with the blockchain in the distributed database of the blockchain before determining whether the damage event occurs on the target commodity based on the collected appearance data of the target commodity and the appearance data of the target commodity that is registered with the distributed database in advance, to obtain the appearance data of the target commodity that is registered with the distributed database in advance.

Optionally, the determining module is further configured to evaluate a damage degree of the target commodity based on the collected appearance data of the target commodity and the appearance data of the target commodity that is registered with the distributed database in advance, to obtain a damage degree score used to indicate the damage degree; determine whether the damage degree score reaches a predetermined threshold; and if yes, determine that the damage event occurs on the target commodity.

Optionally, the determining module is further configured to determine whether a key position of the target commodity is damaged based on the collected appearance data of the target commodity and the appearance data of the target commodity that is registered with the distributed database in advance; and if yes, determine that the damage event occurs on the target commodity.

Optionally, the claim module is configured to broadcast the damage event corresponding to the target commodity to the blockchain, so that member node devices in the blockchain perform consensus processing on the damage event; and if a consensus is reached on the damage event, invoke the smart contract corresponding to the target commodity.

Optionally, an outer surface of the target commodity is coated with an optical medium that is used to cure the appearance data of the target commodity; and the collection module is configured to collect, by using an installed optical sensor, the appearance data of the target commodity that is cured by the optical medium.

Optionally, the optical medium is a nanometer-level optical film.

Optionally, the blockchain is a consortium blockchain.

The present specification further provides an electronic device, including: a processor; and a memory, configured to store an instruction that can be executed by the processor; where the processor reads and executes the machine executable instruction that is stored in the memory and that corresponds to a blockchain-based commodity claim control logic, to collect appearance data of a target commodity, where the appearance data of the target commodity is registered with a distributed database of the blockchain in advance; determine whether a damage event occurs on the target commodity based on the collected appearance data of the target commodity and the appearance data of the target commodity that is registered with the distributed database in advance; and if yes, invoke a smart contract corresponding to the target commodity, and execute a commodity damage claim logic stated in the smart contract, to complete a commodity damage claim for the target commodity.

DESCRIPTION OF IMPLEMENTATIONS

Figure 1:
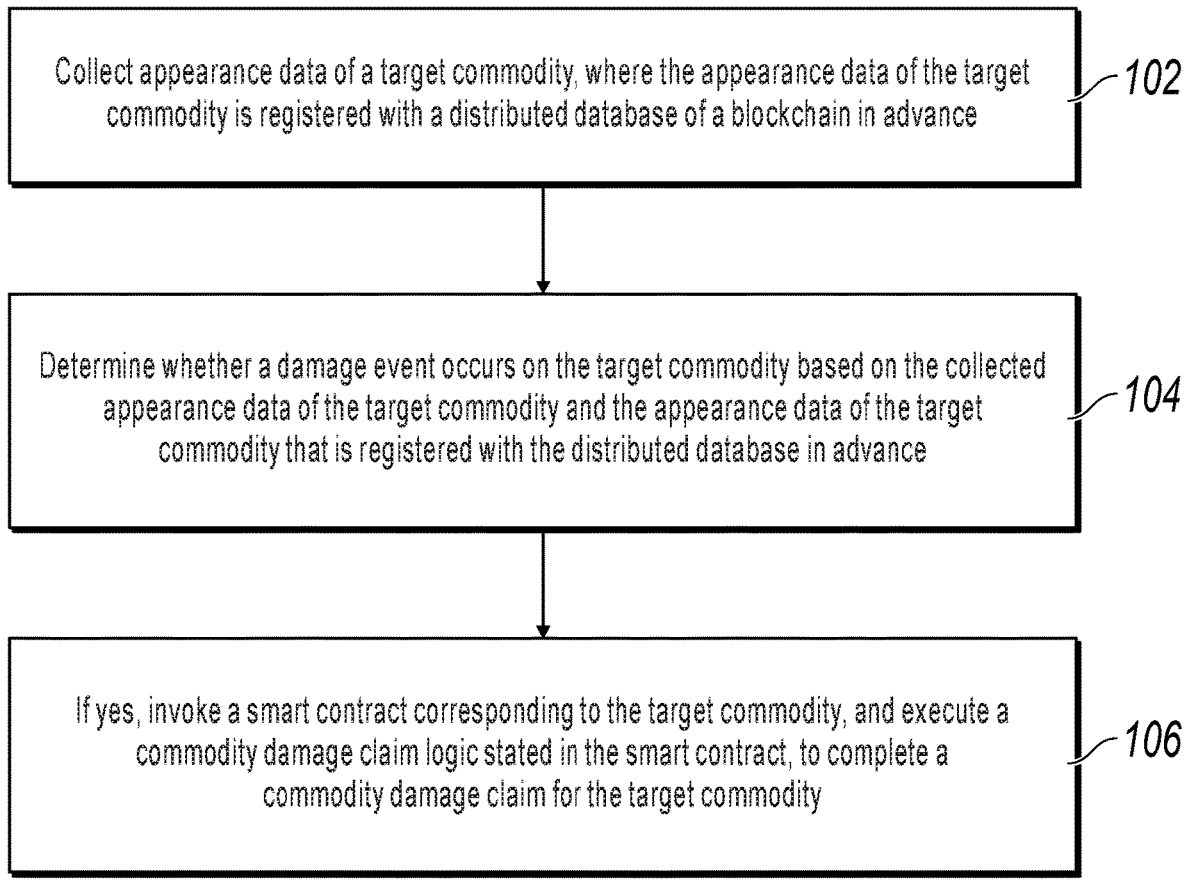
FIG. 1 is a flowchart illustrating a blockchain-based commodity claim method, according to an example implementation.

The present specification aims to provide a technical solution in which appearance data of a commodity is registered with a blockchain and collected appearance data of the commodity is compared with the appearance data of the commodity that is registered with the blockchain to complete a commodity damage claim.

During implementation, a commodity producer and commodity circulators on a commodity circulation channel can join the blockchain in advance as members of the blockchain. For example, the blockchain can be a consortium blockchain. The commodity circulators on the commodity circulation channel can include an intermediary in intermediate links of commodity circulation, and an end consumer. The commodity producer and the commodity circulators on the commodity circulation channel can join the consortium blockchain as consortium blockchain members.

When deploying a damage claim service for a commodity in the blockchain, an operator of the blockchain can deploy a smart contract related to a commodity damage claim in the blockchain, and state a commodity damage claim logic that is to be executed through triggering in the smart contract.

The commodity producer can register appearance data of a produced commodity with a distributed database of the blockchain.

For any commodity circulator on the commodity circulation channel, when a target commodity is circulated to the commodity circulator, the commodity circulator can collect appearance data of the target commodity by using an accessed member node device; determine whether a damage event occurs on the target commodity based on the collected appearance data and appearance data of the target commodity that is registered with the distributed database of the blockchain in advance; and if yes, determine that the damage event occurs on the target commodity in a circulation process. In this case, the member node device can invoke the smart contract, execute the commodity damage claim logic stated in the smart contract, to complete a commodity damage claim for the target commodity.

In the previous technical solution, on the one hand, because of the historical traceability and non-tampering characteristics of the blockchain, appearance data of a commodity can be truly recorded in the blockchain, and appearance data of all commodities can be traced in the blockchain. In addition, because the appearance data of the commodity is jointly maintained by a plurality of node devices in the blockchain, most node devices need to be controlled to tamper with the appearance data of the commodity, and fairness of the stored appearance data of the commodity can be ensured.

On the other hand, because appearance data of a target commodity is easy to be collected, the appearance data of the target commodity is registered with the distributed database of the blockchain. When a damage claim is performed for the target commodity, appearance data of the commodity is collected, and the collected appearance data of the commodity is compared with the appearance data of the commodity that has been registered with the blockchain, to determine whether the target commodity is damaged. When it is determined that the target commodity is damaged, a smart contract related to the commodity damage claim is invoked, and a commodity damage claim logic stated in the smart contract is executed, to quickly complete the damage claim for the target commodity.

The following describes the present specification by using specific implementations with reference to specific application scenarios.

Referring to FIG. 1, FIG. 1 illustrates a blockchain-based commodity claim method, according to an implementation of the present specification. The method is applied to any node device in the blockchain, and includes the following steps:

Step 102: Collect appearance data of a target commodity, where the appearance data of the target commodity is registered with a distributed database of the blockchain in advance.

Step 104: Determine whether a damage event occurs on the target commodity based on the collected appearance data of the target commodity and the appearance data of the target commodity that is registered with the distributed database in advance.

Step 106: If yes, invoke a smart contract corresponding to the target commodity, and execute a commodity damage claim logic stated in the smart contract, to complete a commodity damage claim for the target commodity.

The target commodity can include any type of commodity whose appearance is prone to deformation. In actual applications, a producer of the commodity can upgrade the commodity into an intelligent device by implanting a chip, a sensor, or other forms of intelligent hardware in the commodity, and the intelligent device accesses the blockchain as a member node device.

Correspondingly, the blockchain described in the present specification can be any type of blockchain network that allows the commodity to access as a member.

For example, the blockchain can be a consortium blockchain that includes a terminal device of a commodity producer, terminal devices of commodity circulators such as various levels of suppliers and intermediaries on a commodity circulation channel, and mobile devices of several ordinary consumers. An operator of the consortium blockchain can deploy online services for a commodity damage claim based on the consortium blockchain. Any supplier, intermediary, or ordinary consumer in the consortium blockchain other than the producer can perform, by using an accessed member node device, a commodity damage claim for a commodity that registers an identity with the blockchain and on which a damage event occurs.

The commodity damage claim is a process of applying for compensation from an upstream commodity circulator based on an agreed claim policy if a damage event occurs on a commodity in a commodity circulation process.

Correspondingly, the commodity damage claim logic stated in the smart contract corresponding to the commodity damage claim can include a compensation logic corresponding to the claim policy obtained through negotiation performed by the commodity producer and various levels of commodity circulators.

The specific content of the previously described claim policy is not limited in the present specification, and can be obtained through negotiation performed by the commodity producer and the various levels of commodity circulators in actual applications. For example, the previously described claim policy can be a policy that is obtained through negotiation and in which a compensation amount is determined based on a damage degree of the commodity, or a proportion of a claimed amount to a total amount of the commodity when the commodity is damaged, or the like.

The following describes in detail the technical solutions in the present specification by using specific implementations and an example in which the blockchain is a consortium blockchain.

In the present specification, an operator of the consortium blockchain can construct a consortium blockchain, and a commodity producer, commodity circulators such as various levels of suppliers and intermediaries on a commodity circulation channel, and ordinary consumers can join the consortium blockchain as consortium members.

Both the commodity producer and the commodity circulators can serve as nodes with an "accounting right", write a commodity record (e.g., a commodity production record and a commodity circulation record) generated in various traceable links such as commodity production and circulation into a distributed database (a distributed ledger) of the consortium blockchain, and register appearance data of a commodity with the blockchain. The ordinary consumers can serve as nodes without the "accounting right", initiate a commodity damage claim based on a commodity record stored in the distributed database of the blockchain, determine whether the commodity is damaged based on the appearance data of the commodity that is registered with the blockchain, and complete an online claim for the damaged commodity based on a smart contract that is deployed in the blockchain and that is related to the commodity damage claim.

In the present specification, the operator of the consortium blockchain can deploy a commodity damage claim service in the consortium blockchain based on a specific architecture of the consortium blockchain.

The operator of the consortium blockchain can deploy the commodity damage claim service by publishing a smart contract related to the commodity damage claim service to the consortium blockchain. In this case, the operator can develop the smart contract related to the commodity damage claim in advance, and state a commodity damage claim logic that needs to be executed through triggering in the smart contract.

The commodity damage claim logic stated in the smart contract is not limited in the present specification, and can be obtained through negotiation performed by the operator of the consortium blockchain, a producer of a target commodity, and various levels of commodity circulators.

Further, for the developed smart contract, the operator can publish the smart contract to the consortium blockchain by using any node device in the consortium blockchain. After some specified member node devices (e.g., several specified node devices with an accounting right in the consortium blockchain) in the consortium blockchain reach a consensus, the smart contract is recorded in the distributed database of the consortium blockchain.

Subsequently, any commodity circulator on a commodity circulation channel of the target commodity can access any node device by using client software; submit a transaction (transfer) to the smart contract recorded in the consortium blockchain, to invoke the smart contract; and trigger execution of a service logic of a related commodity damage claim in the consortium blockchain, to complete an online claim for a damaged commodity.

It is worthwhile to note that a consensus algorithm used when member node devices in the consortium blockchain perform consensus processing on the smart contract published to the blockchain and a specific consensus process are not described in detail in the present specification. For an implementation of implementing the technical solutions that are recorded in the present specification by a person skilled in the existing technology, references can be made to records in related technologies.

For example, for the consortium blockchain, a PBFT algorithm or another similar consensus algorithm can be used.

In the present specification, the commodity producer can upgrade a commodity into an intelligent device by implanting a chip, a sensor, or other forms of intelligent hardware in the commodity, and the intelligent device accesses the consortium blockchain as a member node device (in other words, a "co-chain" operation is performed on the commodity).

In an implementation, a generation algorithm of a private key and a public key can be further implanted in the chip, the sensor, or the other forms of intelligent hardware that is implanted in the commodity. When accessing the consortium blockchain as a member node device, the commodity can first create a private key and a public key that are in pairs by invoking the implanted key algorithm.

Then, a transaction used to initiate registration can be constructed. After a signature is performed on the transaction by using the generated private key, the transaction is published in the consortium blockchain, to apply for joining the consortium blockchain. After receiving the transaction, some specified member node devices in the consortium blockchain can verify the signature of the transaction by using the public key corresponding to the private key used when the signature is performed on the transaction and can perform consensus processing on the transaction after the signature verification succeeds.

When a consensus is reached on the transaction, a calculation can be performed on the public key of the commodity, to create an identity identifier (e.g., an access address or an account address) for the commodity in the consortium blockchain. In this case, the commodity successfully joins the consortium blockchain as a member node device, and the identity identifier generated for the commodity is an identity of the member node device in the consortium blockchain.

In the present specification, the commodity producer can register appearance data of a produced commodity with the distributed database of the consortium blockchain.

In an implementation, the commodity producer can collect appearance data of the commodity by using an accessed member node device, and associate the collected appearance data with an identity identifier of the commodity in the consortium blockchain and store the collected appearance data in the distributed database of the blockchain, so that the appearance data of the commodity is used as identity information of the commodity, and registered in an existing identity of the commodity in the consortium blockchain.

In an implementation, an outer surface of the commodity can be pre-coated with an optical medium that is used to cure the appearance data of the commodity.

A specific material of the optical medium is not limited in the present specification, and includes but is not limited to any material that can be used to coat the outer surface of the commodity to cure the appearance data of the commodity.

For example, in an implementation, the optical medium can be a nanometer-level optical film. The nanometer-level optical film can be a nanometer-level carbon structure material. After the outer surface of the commodity is coated with the carbon structure material, a circuit can be formed by wrapping the whole outer surface of the commodity, such as a vehicle, to form a nanometer-level optical film, so as to automatically cure an appearance of the commodity.

An optical sensor that is configured to collect the appearance data of the commodity that is cured by using the nanometer-level optical film can be installed on a member node device in the consortium blockchain. Optical sensing is performed on the nanometer-level optical film by using the optical sensor, to collect the appearance data of the commodity that is cured by using the nanometer-level optical film.

In addition to the previous implementation in which the commodity is coated with the optical medium to cure and collect the appearance data of the commodity, in actual applications, the appearance data of the commodity can be collected by using other methods. Details are omitted in the present specification.

For example, three-dimensional stereo scanning is performed on the commodity, to accurately collect the appearance data of the commodity. Alternatively, an image of the commodity is collected by using a visual technology, and the appearance data of the commodity is generated through a calculation based on the collected image.

After appearance data of the target commodity is registered with the distributed database of the consortium blockchain, when the target commodity is subsequently circulated to any commodity circulator on the commodity circulation channel, the commodity circulator can collect appearance data of the target commodity by using an accessed member node device, and obtain an identity identifier of the target commodity that has been registered with the consortium blockchain.

For example, in an implementation, the member node device can obtain the identity identifier generated for the commodity by performing short-range wireless communication with a chip, a sensor, or other forms of intelligent hardware that is implanted in the commodity.

After obtaining the identity identifier of the target commodity that has been registered with the consortium blockchain, the member node device can further query the appearance data of the commodity that has been registered in an identity indicated by the identity identifier in the distributed database of the consortium blockchain.

Further, the collected appearance data of the target commodity can be compared with the appearance data of the target commodity that has been registered with the distributed database of the consortium blockchain, to determine whether a damage event occurs on the target commodity.

A principle for determining whether the damage event occurs on the target commodity can be obtained through negotiation performed by the operator of the blockchain, the commodity producer, and the various levels of commodity circulators during negotiation of a commodity damage claim policy.

In an implementation, the principle for determining whether the damage event occurs on the target commodity can be as follows: determining whether a damage degree of the target commodity reaches a threshold value.

In this case, when negotiating the commodity damage claim policy, the operator of the blockchain, the commodity producer, and the various levels of commodity circulators can negotiate a damage degree score threshold used to evaluate whether the target commodity is damaged. The member node device can compare the collected appearance data of the target commodity with the appearance data of the target commodity that is registered with the distributed database in advance, and then evaluate the damage degree of the target commodity based on a comparison result, to obtain a damage degree score used to indicate the damage degree.

A specific policy and method for evaluating the damage degree of the commodity based on the appearance data are not particularly limited in the present specification. When a person skilled in the existing technology implements the technical solutions in the present specification, references can be made to records in related technologies.

After the damage degree score of the target commodity is obtained, whether the damage degree score reaches the damage degree threshold can be further determined. If yes, it can be determined that the damage event occurs on the target commodity in a commodity circulation process.

In an implementation, the principle for determining whether the damage event occurs on the target commodity can be as follows: determining whether a key position of the target commodity is damaged. For example, it can be determined, by matching an appearance of the key position, whether the appearance of the key position of the target commodity changes in the circulation process, to determine whether the key position is damaged.

The key position is not particularly limited in the present specification, and can be customized based on actual service demands. For example, for a consumption commodity, the key position can be a sealing part of the commodity.

If the key position of the target commodity is damaged, it can be determined that the damage event occurs on the target commodity in the commodity circulation process.

In actual applications, the principle for determining whether the damage event occurs on the target commodity is not limited to the previous two cases. Details are omitted in the present specification.

In an implementation, after determining that the damage event occurs on the target commodity, the member node device can publish the damage event in the consortium blockchain in a form of a transaction, and member node devices in the consortium blockchain perform consensus processing on the damage event.

In the present specification, consensus processing performed on the damage event in the consortium blockchain is a process in which various node devices jointly determine the damage event.

For example, various node devices can determine, according to the same determining principle, whether the damage event occurs on the target commodity, and then perform consensus processing on the damage event together. After a consensus is reached, it indicates that the node devices in the consortium blockchain jointly determine that the damage event occurs on the target commodity.

In the present specification, after a consensus is reached on the damage event of the target commodity in the consortium blockchain, the smart contract that has been deployed in the consortium blockchain can be invoked, to trigger execution of the commodity damage claim logic stated in the smart contract, so as to complete a commodity damage claim for the target commodity.

In an implementation, the member node device can construct a transaction based on the damage event, and then submit the transaction to the smart contract to invoke the smart contract, so as to trigger the execution of the commodity damage claim logic stated in the smart contract. The smart contract automatically performs commodity damage claim processing on the target commodity, to complete the commodity damage claim for the target commodity.

For example, during implementation, the constructed transaction can include an account address of the smart contract, and then the transaction can be submitted to the smart contract as input of the smart contract based on the account address, to invoke the smart contract, so as to trigger program code related to the commodity damage claim logic stated in smart contract execution.

It is worthwhile to note that when the member node device constructs the transaction used to invoke the smart contract, the transaction can be automatically created by the member node device based on the damage event, or can be manually created by a user.

For example, an operation entry for initiating a commodity damage claim can be provided for the user on client software connected to the member node device, and the user can trigger, by using the operation entry, the member node device to automatically create, based on the determined damage event, the transaction used to invoke the smart contract.

Further, when the smart contract is invoked, the member node device can output a commodity damage claim result to a commodity circulator by using the client software in a form of a prompt message.

For example, when the commodity damage claim for the target commodity is completed, a prompt message: "The commodity is damaged, a damage claim has been performed, and a claim amount is RMB XXX" can be output by using the client software.

It can be seen from the previous implementations that on the one hand, because of the historical traceability and non-tampering characteristics of the blockchain, appearance data of a commodity can be truly recorded in the blockchain, and appearance data of all commodities can be traced in the blockchain. In addition, because the appearance data of the commodity is jointly maintained by a plurality of node devices in the blockchain, most node devices need to be controlled to tamper with the appearance data of the commodity, and fairness of the stored appearance data of the commodity can be ensured.

On the other hand, because appearance data of a target commodity is easy to be collected, the appearance data of the target commodity is registered with the distributed database of the blockchain. When a damage claim is performed for the target commodity, appearance data of the commodity is collected, and the collected appearance data of the commodity is compared with the appearance data of the commodity that has been registered with the blockchain, to determine whether the target commodity is damaged. When it is determined that the target commodity is damaged, a smart contract related to the commodity damage claim is invoked, and a commodity damage claim logic stated in the smart contract is executed, to quickly complete the damage claim for the target commodity.

Figure 2:
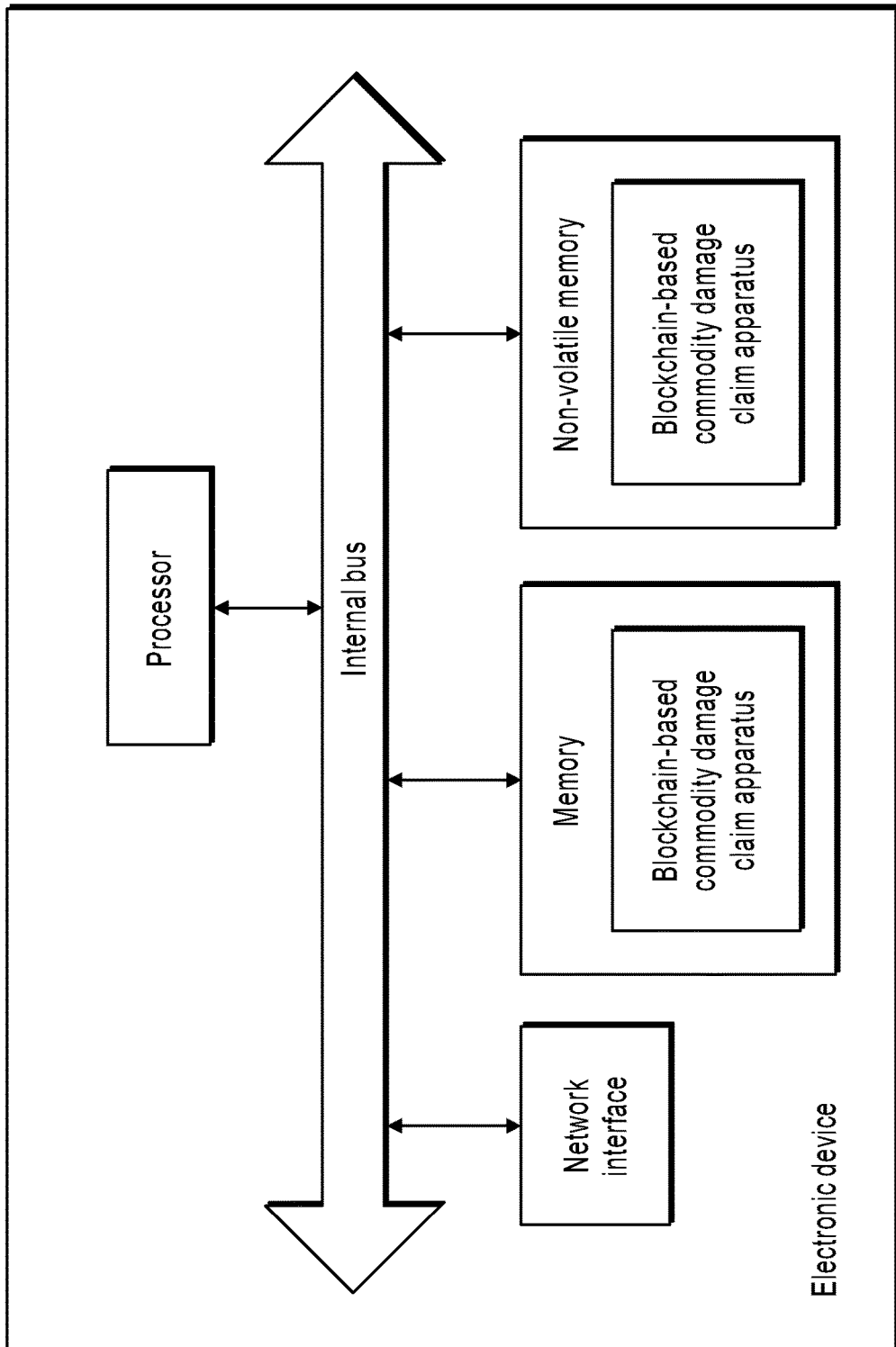
FIG. 2 is a schematic structural diagram illustrating an electronic device, according to an example implementation.

Corresponding to the previous method implementation, the present specification further provides an implementation of a blockchain-based commodity claim apparatus. The implementation of the blockchain-based commodity claim apparatus in the present specification can be applied to an electronic device. The apparatus implementation can be implemented by software, hardware, or a combination of hardware and software. Software implementation is used as an example. As a logical device, the device is formed by reading a corresponding computer program instruction in a non-volatile memory to a memory by a processor of an electronic device where the device is located. In terms of hardware, referring to FIG. 2, FIG. 2 is a structural diagram illustrating hardware of an electronic device where a blockchain-based commodity claim apparatus is located, according to the present specification. In addition to a processor, a memory, a network interface, and a non-volatile memory shown in FIG. 2, the electronic device where the apparatus is located in the present implementation can usually include other hardware based on actual functions of the electronic device. Details are omitted here for simplicity.

Figure 3:
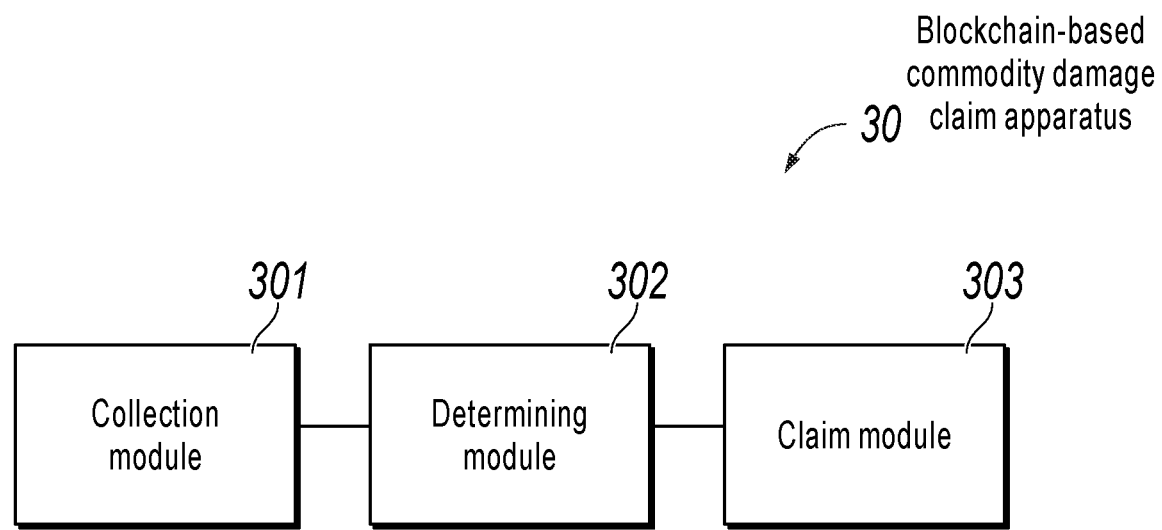
FIG. 3 is a block diagram illustrating a blockchain-based commodity claim apparatus, according to an example implementation.

FIG. 3 is a block diagram illustrating a blockchain-based commodity claim apparatus, according to an example implementation of the present specification.

Referring to FIG. 3, the blockchain-based commodity claim apparatus 30 can be applied to the electronic device shown in FIG. 2, and includes a collection module 301, a determining module 302, and a claim module 303.

The collection module 301 is configured to collect appearance data of a target commodity, where the appearance data of the target commodity is registered with a distributed database of the blockchain in advance.

The determining module 302 is configured to determine whether a damage event occurs on the target commodity based on the collected appearance data of the target commodity and the appearance data of the target commodity that is registered with the distributed database in advance.

The claim module 303 is configured to invoke a smart contract corresponding to the target commodity and execute a commodity damage claim logic stated in the smart contract if the damage event occurs on the target commodity, to complete a commodity damage claim for the target commodity.

In the present implementation, the apparatus further includes: a registration module 304 (not shown in FIG. 3), configured to associate the appearance data of the target commodity with an identity of the target commodity that has been registered with the blockchain and store the appearance data of the target commodity in the distributed database of the blockchain.

In the present implementation, the determining module 302 is further configured to query the stored appearance data that is associated with the identity of the target commodity that has been registered with the blockchain in the distributed database of the blockchain before determining whether the damage event occurs on the target commodity based on the collected appearance data of the target commodity and the appearance data of the target commodity that is registered with the distributed database in advance, to obtain the appearance data of the target commodity that is registered with the distributed database in advance.

In the present implementation, the determining module 302 is further configured to evaluate a damage degree of the target commodity based on the collected appearance data of the target commodity and the appearance data of the target commodity that is registered with the distributed database in advance, to obtain a damage degree score used to indicate the damage degree; determine whether the damage degree score reaches a predetermined threshold; and if yes, determine that the damage event occurs on the target commodity.

In the present implementation, the determining module 302 is further configured to determine whether a key position of the target commodity is damaged based on the collected appearance data of the target commodity and the appearance data of the target commodity that is registered with the distributed database in advance; and if yes, determine that the damage event occurs on the target commodity.

In the present implementation, the claim module 303 is further configured to broadcast the damage event corresponding to the target commodity to the blockchain, so that member node devices in the blockchain perform consensus processing on the damage event; and if a consensus is reached on the damage event, invoke the smart contract corresponding to the target commodity.

In the present implementation, an outer surface of the target commodity is coated with an optical medium that is used to cure the appearance data of the target commodity.

The collection module 301 is configured to collect, by using an installed optical sensor, the appearance data of the target commodity that is cured by the optical medium.

In the present implementation, the optical medium is a nanometer-level optical film.

In the present implementation, the blockchain is a consortium blockchain.

For an implementation process of functions and roles of various modules in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The modules described as separate parts may or may not be physically separate, and parts displayed as modules may or may not be physical modules, may be located in one position, or may be distributed on a plurality of network modules. Some or all of the modules can be selected based on actual demands to achieve the objectives of the solutions of the present specification. A person of ordinary skill in the existing technology can understand and implement the implementations of the present application without creative efforts.

The system, apparatus, or module illustrated in the previous implementations can be implemented by using a computer chip or an entity, or can be implemented by using a product having a certain function. A typical implementation device is a computer, and the computer can be a personal computer, a laptop computer, a cellular phone, a camera phone, an smartphone, a personal digital assistant, a media player, a navigation device, an email receiving and sending device, a game console, a tablet computer, a wearable device, or any combination of these devices.

Corresponding to the previous method implementation, the present specification further provides an implementation of an electronic device. The electronic device includes a processor and a memory that is configured to store an instruction that can be executed by the processor, where the processor and the memory are connected to each other by using an internal bus. In another possible implementation, the device may further include an external interface, to communicate with another device or component.

In the present implementation, the processor reads and executes the machine executable instruction that is stored in the memory and that corresponds to a blockchain-based commodity claim control logic, to collect appearance data of a target commodity, where the appearance data of the target commodity is registered with a distributed database of the blockchain in advance; determine whether a damage event occurs on the target commodity based on the collected appearance data of the target commodity and the appearance data of the target commodity that is registered with the distributed database in advance; and if yes, invoke a smart contract corresponding to the target commodity, and execute a commodity damage claim logic stated in the smart contract, to complete a commodity damage claim for the target commodity.

In the present implementation, the processor reads and executes the machine executable instruction that is stored in the memory and that corresponds to a blockchain-based commodity claim control logic, to associate the appearance data of the target commodity with an identity of the target commodity that has been registered with the blockchain and store the appearance data of the target commodity in the distributed database of the blockchain.

In the present implementation, the processor reads and executes the machine executable instruction that is stored in the memory and that corresponds to a blockchain-based commodity claim control logic, to query the stored appearance data that is associated with the identity of the target commodity that has been registered with the blockchain in the distributed database of the blockchain, to obtain the appearance data of the target commodity that is registered with the distributed database in advance.

In the present implementation, the processor reads and executes the machine executable instruction that is stored in the memory and that corresponds to a blockchain-based commodity claim control logic, to evaluate a damage degree of the target commodity based on the collected appearance data of the target commodity and the appearance data of the target commodity that is registered with the distributed database in advance, to obtain a damage degree score used to indicate the damage degree; determine whether the damage degree score reaches a predetermined threshold; and if yes, determine that the damage event occurs on the target commodity.

In the present implementation, the processor reads and executes the machine executable instruction that is stored in the memory and that corresponds to a blockchain-based commodity claim control logic, to determine whether a key position of the target commodity is damaged based on the collected appearance data of the target commodity and the appearance data of the target commodity that is registered with the distributed database in advance; and if yes, determine that the damage event occurs on the target commodity.

In the present implementation, the processor reads and executes the machine executable instruction that is stored in the memory and that corresponds to a blockchain-based commodity claim control logic, to broadcast the damage event corresponding to the target commodity to the blockchain, so that member node devices in the blockchain perform consensus processing on the damage event; and if a consensus is reached on the damage event, invoke the smart contract corresponding to the target commodity.

In the present implementation, an outer surface of the target commodity is coated with an optical medium that is used to cure the appearance data of the target commodity.

The processor reads and executes the machine executable instruction that is stored in the memory and that corresponds to a blockchain-based commodity claim control logic, to collect, by using an installed optical sensor, the appearance data of the target commodity that is cured by the optical medium.

A person skilled in the existing technology can easily figure out other implementation solutions of the present specification after considering the present specification and practicing the disclosed invention here. The present specification is intended to cover any variations, functions, or adaptive changes of the present specification. These variations, functions, or adaptive changes comply with general principles of the present specification and include common knowledge or commonly used technical means in the technical field that are not disclosed in the present specification. The specification and the implementations are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present disclosure. The scope of the present specification is limited by the appended claims only.

The previous descriptions are merely example implementations of the present specification, but are not intended to limit the present specification. Any modification, equivalent replacement, or improvement made without departing from the spirit and principle of the present specification shall fall within the protection scope of the present specification.

Figure 4:
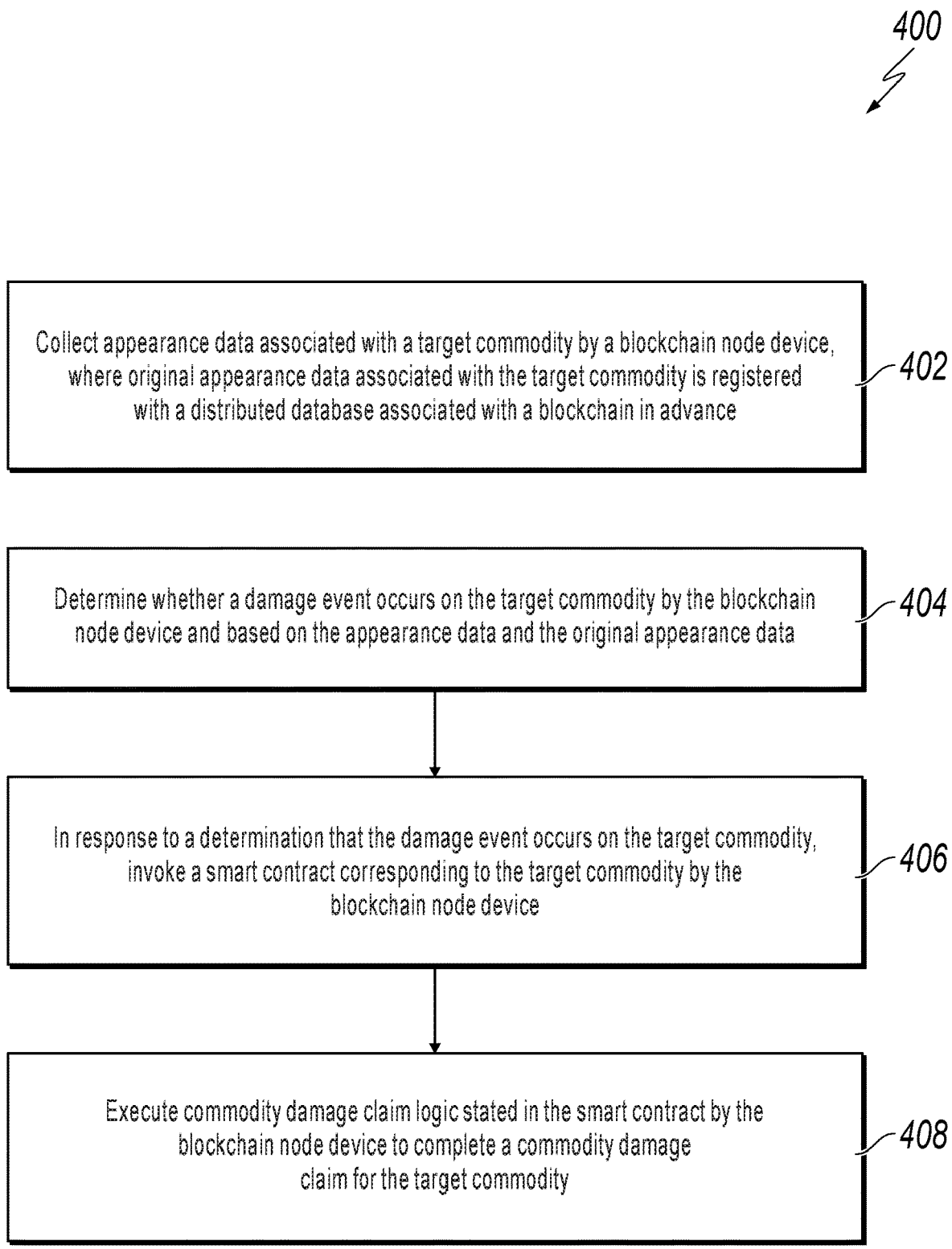
FIG. 4 is a flowchart illustrating an example of a computer-implemented method for processing a commodity damage claim, according to an implementation of the present disclosure.

FIG. 4 is a flowchart illustrating an example of a computer-implemented method 400 for processing a commodity damage claim, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, appearance data associated with a target commodity is collected by a blockchain node device, where original appearance data associated with the target commodity is registered with a distributed database associated with a blockchain in advance. In some implementations, an outer surface of the target commodity is coated with an optical medium that is used to cure the appearance data of the target commodity, where collecting appearance data of the target commodity comprises collecting, by using an installed optical sensor, the appearance data of the target commodity that is cured by the optical medium. From 402, method 400 proceeds to 404.

At 404, a determination is made as to whether a damage event occurs on the target commodity based on the appearance data and the original appearance data.

In some implementations, determining whether a damage event occurs on the target commodity includes evaluating a damage degree of the target commodity based on the appearance data and the original appearance data to obtain a damage degree score used to indicate the damage degree; determining whether the damage degree score reaches a predetermined threshold; and if it is determined that the damage degree score reaches the predetermined threshold, determining that the damage event occurs on the target commodity.

In some implementations, determining whether a damage event occurs on the target commodity includes determining whether a key position of the target commodity is damaged based on the appearance data and the original appearance data; and if it is determined that the key position is damaged, determining that the damage event occurs on the target commodity. After 404, method 400 proceeds to 406.

At 406, in response to a determination that the damage event occurs on the target commodity, a smart contract corresponding to the target commodity is invoked by the blockchain node device. In some implementations, invoking the smart contract includes submitting a transaction to the smart contract, wherein the smart contract is recorded in the blockchain, and wherein the smart contract was recorded in the blockchain after a plurality of specified blockchain node devices reached a consensus. From 406, method 400 proceeds to 408.

At 408, commodity damage claim logic stated in the smart contract is executed to complete a commodity damage claim for the target commodity.

In some implementations, method 400 further includes prior to collecting the appearance data associated with the target commodity: associating the original appearance data with an identity of the target commodity, wherein the target commodity is registered with the blockchain, and storing the original appearance data in the distributed database.

In some implementations, method 400 further includes prior to determining whether a damage event occurs on the target commodity: obtaining an identity identifier of the target commodity; and querying the original appearance data by the identity identifier in the distributed database of the blockchain to obtain the original appearance data. After 408, method 400 can stop.

Implementations of the present application can solve technical problems in determining and processing damage claims. Traditionally, to initiate a damage claim after an accident occurs, the insured has to make a report and wait for the insurance company sending adjusters for further investigation to determine whether damage is incurred and the degree of the damage in the case. This process can take a relatively long time and requires significant labor and monetary investment from the insurance company. Further, because each case is processed individually, factors such as adjuster human error may affect the accuracy of the evaluation of the damage. In addition, because different insurance companies may have different policies and procedures, the same accident may be evaluated differently for different insurance companies, causing confusion and uncertainty to the insured. What is needed is a technique to bypass these problems in the traditional method and to provide a more accurate, efficient, and unified solution for determining a damage claim.

Implementations of the present application provide methods and apparatuses for automatically determining whether a commodity is damaged and initiating a damage claim for a damaged commodity. According to these implementations, when a damage claim is performed for the target commodity, appearance data of the commodity is collected, and the collected appearance data of the commodity is compared with the appearance data of the commodity that has been registered with the blockchain, to determine whether the target commodity is damaged. When it is determined that the target commodity is damaged, a smart contract related to the commodity damage claim is invoked, and commodity damage claim logic stated in the smart contract is executed, to quickly complete the damage claim for the target commodity.

In some implementations, because appearance data of a target commodity is easy to be collected, the appearance data of the target commodity is registered with the distributed database of the blockchain. Further, because of the historical traceability and non-tampering characteristics of the blockchain, appearance data of a commodity can be accurately recorded in the blockchain, and appearance data of all commodities can be traced in the blockchain. In addition, because the appearance data of the commodity is jointly maintained by a number of node devices in the blockchain, most node devices need to be controlled to tamper with the appearance data of the commodity, and the integrity of the stored appearance data of the commodity can be ensured.

The whole process can be triggered and completed automatically without human intervention. For example, the producer of the commodity, the transferring parties of the commodity on the circulation channel of the commodity (include any intermediary of the middle of the commodity circulation and the final consumer) can be added to a blockchain network as members in advance. The operator of the blockchain can then deploy smart contracts related to damage claims for goods on the blockchain as well as declare the damage claim logic that triggers execution in the smart contract. The producer of the commodity can collect the appearance data of the commodity through the accessed member node device, and then associate the collected appearance data with the identity of the commodity in the consortium chain in the distributed database of the consortium chain, to register the appearance data of the item to the existing identity of the item on the consortium chain. When the target commodity flow is transferred to any commodity flow party in the commodity flow channel, the appearance data of the target commodity may be collected by the accessed member node device, and based on the collected appearance data, and pre-registered appearance dare of the target commodity of the distributed database of the chain to determine whether the target commodity has a damage event.

If a damage event occurs, the member node device may initiate a call to the smart contract, to execute the commodity damage claim logic declared by the smart contract, and to complete a damage claim for the target commodity. For example, the node device may construct a transaction based on the above-mentioned damage event, and then submit the transaction to the smart contract to initiate a contract call to the smart contract to trigger the execution of the commodity damage claim logic declared in the smart contract. The contract automatically executes the product damage claim processing for the above-mentioned targeted commodity to complete the product damage claim for the target commodity. As such, for example, human errors in the process can be reduced to a minimum, data processing speed can be increased, and data processing accuracy and consistency are both improved.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    collecting, from an optical sensor of a blockchain node device, current appearance data associated with a target commodity;
    querying, by the blockchain node device, original appearance data associated with the target commodity, wherein the original appearance data is stored in a distributed database of a blockchain;
    obtaining, by the blockchain node device, the original appearance data associated with the target commodity from the distributed database of the blockchain;
    comparing, by the blockchain node device, the current appearance data and the original appearance data;

determining, by the blockchain node device, that a damage event has occurred on the target commodity based on a comparison of the current appearance data and the original appearance data;

in response to the determination that the damage event has occurred on the target commodity, invoking, by the blockchain node device, a smart contract corresponding to the target commodity;

executing, by the blockchain node device, commodity damage claim logic stated in the smart contract; and completing a commodity damage claim for the target commodity.

2. The computer-implemented method of claim 1, further comprising:

prior to collecting the current appearance data associated with the target commodity:

registering the original appearance data as an identity of the target commodity, wherein the target commodity is registered with the blockchain, and storing the original appearance data in the distributed database.

3. The computer-implemented method of claim 1, further comprising:

prior to determining that the damage event has occurred on the target commodity based on the comparison of the current appearance data and the original appearance data:

obtaining an identifier of the target commodity; and querying the original appearance data by the identifier in the distributed database of the blockchain to obtain the original appearance data.

4. The computer-implemented method of claim 1, wherein determining that the damage event has occurred on the target commodity based on the comparison of the current appearance data and the original appearance data comprises:

evaluating a damage degree of the target commodity based on the current appearance data and the original appearance data to obtain a damage degree score used to indicate the damage degree;

determining whether the damage degree score reaches a predetermined threshold; and in response to determining that the damage degree score reaches the predetermined threshold, determining that the damage event has occurred on the target commodity.

5. The computer-implemented method of claim 1, wherein determining that the damage event has occurred on the target commodity based on the comparison of the current appearance data and the original appearance data comprises:

determining whether a key position of the target commodity is damaged based on the current appearance data and the original appearance data; and in response to determining that the key position is damaged, determining that the damage event has occurred on the target commodity.

6. The computer-implemented method of claim 1, wherein invoking the smart contract comprises:

submitting a transaction to the smart contract, wherein the smart contract is recorded in the blockchain, and wherein the smart contract is recorded in the blockchain after a plurality of specified blockchain node devices reached a consensus.

7. The computer-implemented method of claim 1, wherein an outer surface of the target commodity is coated with an optical medium that is used to cure the original appearance data and the current appearance data associated with the target commodity, and wherein collecting the current appearance data associated with the target commodity comprises collecting, by the optical sensor, the current appearance data associated with the target commodity that is cured by the optical medium.

8. A non-transitory, computer-readable medium storing one or more instructions executable by a processor of a blockchain node device that, when executed by the processor, cause the processor to perform one or more operations comprising:

collecting, from an optical sensor of the blockchain node device, current appearance data associated with a target commodity;

querying original appearance data associated with the target commodity, wherein the original appearance data is stored in a distributed database of a blockchain;

obtaining, the original appearance data associated with the target commodity from the distributed database of the blockchain;

comparing, the current appearance data and the original appearance data;

determining that a damage event has occurred on the target commodity based on a comparison of the current appearance data and the original appearance data;

in response to the determination that the damage event has occurred on the target commodity, invoking a smart contract corresponding to the target commodity;

executing commodity damage claim logic stated in the smart contract; and completing a commodity damage claim for the target commodity.

9. The non-transitory, computer-readable medium of claim 8, the one or more operations further comprising:

prior to collecting the current appearance data associated with the target commodity:

registering the original appearance data as an identity of the target commodity, wherein the target commodity is registered with the blockchain, and storing the original appearance data in the distributed database.

10. The non-transitory, computer-readable medium of claim 8, the one or more operations further comprising:

prior to determining that the damage event has occurred on the target commodity based on the comparison of the current appearance data and the original appearance data:

obtaining an identifier of the target commodity; and querying the original appearance data by the identifier in the distributed database of the blockchain to obtain the original appearance data.

11. The non-transitory, computer-readable medium of claim 8, wherein determining that the damage event has occurred on the target commodity based on the comparison of the current appearance data and the original appearance data comprises:

evaluating a damage degree of the target commodity based on the current appearance data and the original appearance data to obtain a damage degree score used to indicate the damage degree;

determining whether the damage degree score reaches a predetermined threshold; and in response to determining that the damage degree score reaches the predetermined threshold, determining that the damage event has occurred on the target commodity.

12. The non-transitory, computer-readable medium of claim 8, wherein determining that the damage event has occurred on the target commodity based on the comparison of the current appearance data and the original appearance data comprises:

determining whether a key position of the target commodity is damaged based on the current appearance data and the original appearance data; and in response to determining that the key position is damaged, determining that the damage event has occurred on the target commodity.

13. The non-transitory, computer-readable medium of claim 8, wherein invoking the smart contract comprises:

submitting a transaction to the smart contract, wherein the smart contract is recorded in the blockchain, and wherein the smart contract is recorded in the blockchain after a plurality of specified blockchain node devices reached a consensus.

14. The non-transitory, computer-readable medium of claim 8, wherein an outer surface of the target commodity is coated with an optical medium that is used to cure the original appearance data and the current appearance data associated with the target commodity, and wherein collecting the current appearance data associated with the target commodity comprises collecting, by the optical sensor, the current appearance data associated with the target commodity that is cured by the optical medium.

15. A computer-implemented system, comprising a blockchain node device, the blockchain node device comprising
an optical sensor,
one or more processors, and
one or more computer memory devices interoperably coupled with the one or more processors and having tangible, non-transitory, machine-readable media storing one or more instructions that, when executed by the one or more processors, perform one or more operations comprising:

collecting, from the optical sensor, current appearance data associated with a target commodity;

querying original appearance data associated with the target commodity, wherein the original appearance data is stored in a distributed database of a blockchain;

obtaining the original appearance data associated with the target commodity from the distributed database of the blockchain;

comparing the current appearance data and the original appearance data;

determining that a damage event has occurred on the target commodity based on a comparison of the current appearance data and the original appearance data;

in response to the determination that the damage event has occurred on the target commodity, invoking a smart contract corresponding to the target commodity;

executing commodity damage claim logic stated in the smart contract; and completing a commodity damage claim for the target commodity.

16. The computer-implemented system of claim 15, wherein the one or more operations further comprise:

prior to collecting the current appearance data associated with the target commodity:

registering the original appearance data as an identity of the target commodity, wherein the target commodity is registered with the blockchain, and storing the original appearance data in the distributed database.

17. The computer-implemented system of claim 15, wherein the one or more operations further comprise:

prior to determining that the damage event has occurred on the target commodity based on the comparison of the current appearance data and the original appearance data:

obtaining an identifier of the target commodity; and querying the original appearance data by the identifier in the distributed database of the blockchain to obtain the original appearance data.

18. The computer-implemented system of claim 15, wherein determining that the damage event has occurred on the target commodity based on the comparison of the current appearance data and the original appearance data comprises:

evaluating a damage degree of the target commodity based on the current appearance data and the original appearance data to obtain a damage degree score used to indicate the damage degree;

determining whether the damage degree score reaches a predetermined threshold; and in response to determining that the damage degree score reaches the predetermined threshold, determining that the damage event has occurred on the target commodity.

19. The computer-implemented system of claim 15, wherein determining that the damage event has occurred on the target commodity based on the comparison of the current appearance data and the original appearance data comprises:

determining whether a key position of the target commodity is damaged based on the current appearance data and the original appearance data; and in response to determining that the key position is damaged, determining that the damage event has occurred on the target commodity.

20. The computer-implemented system of claim 15, wherein invoking the smart contract comprises:

submitting a transaction to the smart contract, wherein the smart contract is recorded in the blockchain, and wherein the smart contract is recorded in the blockchain after a plurality of specified blockchain node devices reached a consensus.

* * * * *